United States Patent
McFarland et al.

(10) Patent No.: US 9,874,128 B2
(45) Date of Patent: Jan. 23, 2018

(54) INJECTOR CORROSION ISOLATION SEAL

(71) Applicant: Continental Automotive Systems, Inc., Auburn Hills, MI (US)

(72) Inventors: Robert W. McFarland, Smithfield, VA (US); Todd M. Detweiler, Virginia Beach, VA (US); Keith A. Shaw, Yorktown, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 23 days.

(21) Appl. No.: 14/507,880

(22) Filed: Oct. 7, 2014

(65) Prior Publication Data

US 2015/0121850 A1    May 7, 2015

Related U.S. Application Data

(60) Provisional application No. 61/900,718, filed on Nov. 6, 2013.

(51) Int. Cl.
    *B05B 1/30*      (2006.01)
    *F01N 3/24*      (2006.01)
    (Continued)

(52) U.S. Cl.
    CPC ............... *F01N 3/24* (2013.01); *F01N 3/206* (2013.01); *F01N 3/2066* (2013.01); *F16J 15/34* (2013.01); *F01N 2610/1453* (2013.01); *F02M 51/0664* (2013.01); *F02M 61/08* (2013.01); *F02M 2200/05* (2013.01); *F02M 2200/16* (2013.01); *F02M 2200/9015* (2013.01); *Y02T 10/24* (2013.01)

(58) Field of Classification Search
    CPC .......... F01N 3/24; F01N 3/206; F01N 3/2066; F16J 15/34
    USPC ....................................................... 239/585.1
    See application file for complete search history.

(56) References Cited

U.S. PATENT DOCUMENTS 4,586,656 A * 5/1986 Wich .................... F02M 59/466
    123/458
5,692,723 A * 12/1997 Baxter ............... F02M 51/0639
    137/550

(Continued)

FOREIGN PATENT DOCUMENTS

CN      103201471 A      7/2013
WO      2012049175 A1      4/2012

(Continued)

OTHER PUBLICATIONS

European Patent Office Search Report dated Mar. 13, 2015.

(Continued)

*Primary Examiner* — Arthur O Hall
*Assistant Examiner* — Adam J Rogers

(57) ABSTRACT

A fluid injector includes a valve assembly constructed and arranged to control flow of fluid from an inlet to an outlet of the injector. A metal housing surrounds at least a portion of the valve assembly. A plastic body is molded over at least a portion of the housing. A distal end of the body defines an integral stepped portion extending from the body. A carrier surrounds at least the distal end of the body. A seal member is in contact with at least the stepped portion and a surface of the carrier to prevent liquid from entering a space between the housing and the body.

23 Claims, 3 Drawing Sheets

(51) Int. Cl.
  *F01N 3/20* (2006.01)
  *F16J 15/34* (2006.01)
  *F02M 51/06* (2006.01)
  *F02M 61/08* (2006.01)

(56) References Cited

U.S. PATENT DOCUMENTS

| | | | | |
|---|---|---|---|---|
| 6,264,112 | B1* | 7/2001 | Landschoot | F02M 51/0667 239/5 |
| 6,302,337 | B1* | 10/2001 | Kimmel | F02M 51/0664 239/408 |
| 2002/0047054 | A1* | 4/2002 | Dallmeyer | F02M 51/005 239/585.1 |
| 2002/0139871 | A1* | 10/2002 | Hokao | F02M 51/0682 239/585.1 |
| 2007/0221748 | A1* | 9/2007 | Hornby | F02M 31/125 239/135 |
| 2008/0135020 | A1* | 6/2008 | Hornby | F02M 55/007 123/478 |
| 2009/0184184 | A1* | 7/2009 | Schwegler | F02M 51/0671 239/585.1 |
| 2013/0061578 | A1* | 3/2013 | Van Vuuren | F01N 3/2066 60/295 |
| 2013/0228231 | A1 | 9/2013 | Nagel et al. | |

FOREIGN PATENT DOCUMENTS

| | | |
|---|---|---|
| WO | 2013025860 A1 | 2/2013 |
| WO | 2013039870 A1 | 3/2013 |

OTHER PUBLICATIONS

Chinese Office Action and English translation of same for corresponding Chinese patent application 20140698990.0 dated Dec. 22, 2016.

Decision to Grant a European Patent, for counterpart EPO patent application EP14189172.1, dated Nov. 17, 2016.

* cited by examiner

INJECTOR CORROSION ISOLATION SEAL

This application claims priority from U.S. Provisional Patent Application No. 61/900,718, filed on Nov. 6, 2013, the content of which is hereby incorporated by reference into this specification.

FIELD

The invention relates generally to a seal of a fluid injector for a Reductant Delivery Unit (RDU) and, more particularly, to an improved seal used for preventing corrosion in the injector.

BACKGROUND

With reference to FIG. 1, a typical fluid injector 10 configured as an RDU employs a plastic body 20 molded over a metallic housing 44. These components reside in an area shown by arrow 11 where liquids from the environment may pool, such as rainwater and saltwater. Saltwater is known to be very corrosive and capable of shorting electrical components due to its ionic nature. Differing thermal expansion rates of the molded plastic body 20 and the metallic housing 44 creates gaps that allow pooled liquids to be drawn past O-ring 50 into the interior of the injector (between housing 44 and body 20), since the O-ring 50 seals only between the metal housing 44 and a carrier 56. Subsequent corrosion and electrical shorting may render the injector inoperable.

Accordingly, there exists a need for an improved seal that in an injector that prevents exposure of vulnerable metal components to corrosive liquids.

SUMMARY

An objective of the invention is to fulfill the need referred to above. In accordance with the principles of an embodiment, this objective is achieved by a fluid injector that includes a valve assembly constructed and arranged to control flow of fluid from an inlet to an outlet of the injector. A metal housing surrounds at least a portion of the valve assembly. A plastic body is molded over at least a portion of the housing. A distal end of the body defines an integral stepped portion extending from the body. A carrier surrounds at least the distal end of the body. A seal member is in contact with at least the stepped portion and a surface of the carrier to prevent liquid from entering a space between the housing and the body.

In accordance with another aspect of an embodiment, a method seals a fluid injector. The injector has a metal housing surrounding at least a portion of a valve assembly; a plastic body molded over at least a portion of the housing; and a carrier surrounding at least a distal end of the body. The method provides a stepped portion integral with the distal end of the housing. The stepped portion and a portion of the carrier are engaged with a seal member to prevent liquid from entering a space between the housing and the body.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

The following description of the preferred embodiment(s) is merely exemplary in nature and is in no way intended to limit the invention, its application, or uses.

Figure 1:
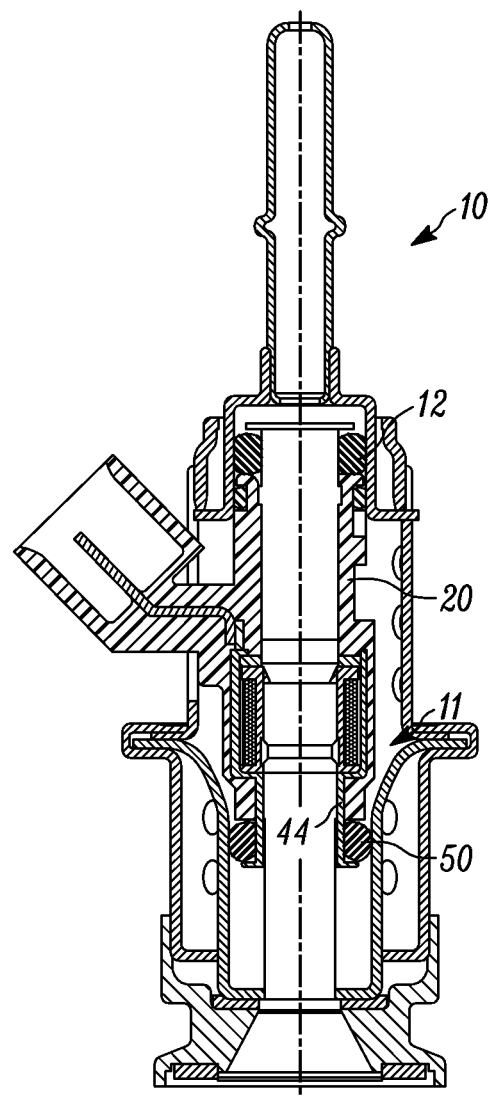
FIG. 1 is a cross-sectional view of an conventional fluid injector for use as an RDU.
Figure 2:
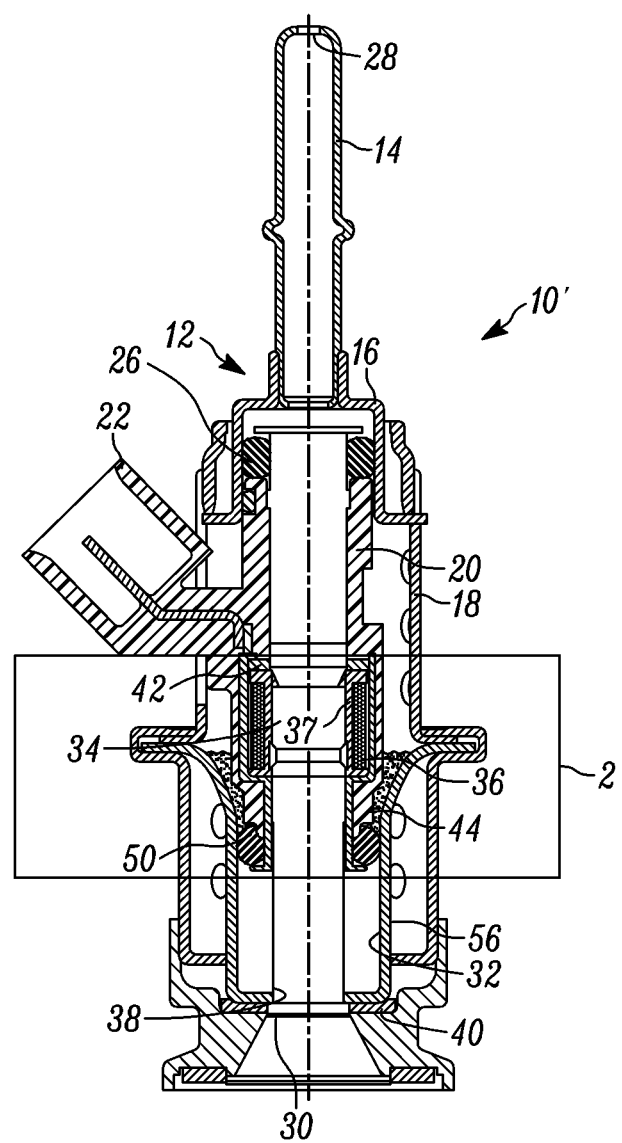
FIG. 2 is a cross-sectional view of a fluid injector, for use in as an RDU, having an improved corrosion isolation seal according to an embodiment of the present invention.

With reference to FIG. 2, a fluid injector according to an embodiment of the present invention is shown, generally at 10'. The injector 10' includes an inlet cup structure, shown generally at 12, having a cup tube 14, and an inlet cup 16. The cup tube 14 can be connected to a source of reductant when the injector is configured as an RDU of a Selective Catalytic Reduction (SCR) system of a vehicle. The inlet cup 16 is connected to a shield 18, and the shield 18 substantially surrounds part of a plastic body 20 having a connector 22.

A portion of an inlet tube 24 is disposed within the body 20. A primary seal member 26, such as an elastomer O-ring, surrounds part of the inlet tube 24 so as to provide a seal between the inlet tube 24, the inlet cup 16, and the body 20.

The fluid injector 10' has a fluid inlet 28 at an upstream end of the injector, a fluid outlet 30 at a downstream end of the injector, and a fluid passageway 32 extending from the fluid inlet 28 to the fluid outlet 30. The injector 10' is of the conventional, solenoid-operated type, having an armature 34 operated by a coil 36 disposed on a plastic bobbin 37. Electromagnetic force is generated by current flow from the electronic control unit (not shown) through the coil 36. Movement of the end 38 of the armature 34 either separates end 38 from or contiguously engages end 38 with seat 40. When the coil 36 is energized, the end 38 of the armature 34 moves toward a fixed pole piece 42 so as to be lifted off the injector valve seat 40 to allow pressurized fluid to exit the outlet 30 of the injector 10' in the conventional manner. The pole piece 42, armature 34 and coil 36 can be considered to be part of a valve assembly, generally indicated 43, that controls fluid flow from the fluid inlet 28 to the fluid outlet 30.

Figure 3:
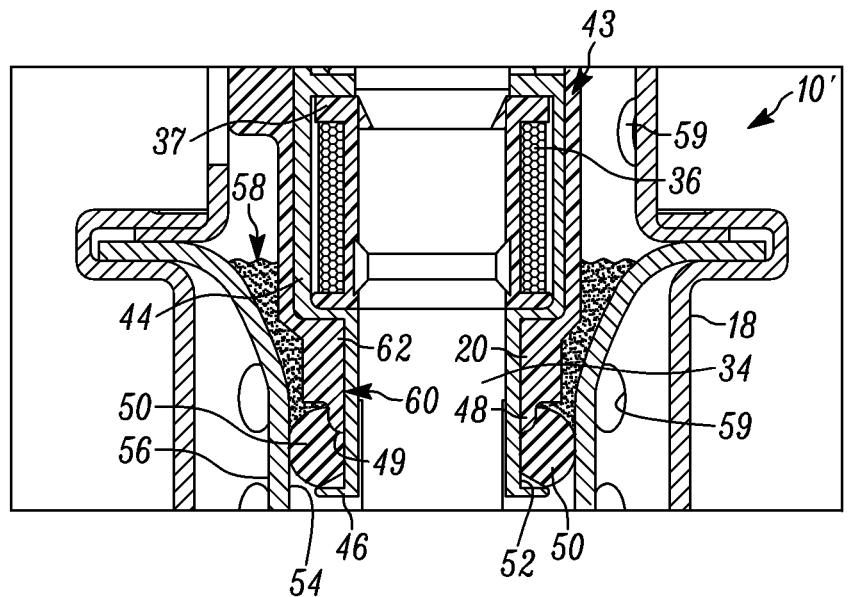
FIG. 3 is an enlarged view of the enclosed portion 3 of FIG. 1.

As best shown in FIG. 3, a metal housing 44 at least partially surrounds the coil 36 and bobbin 37 and a part of the armature 36. The housing 44 is overmolded by the plastic body 20. A distal end of the housing 44 includes a flange 46 for holding the seal member 50. In accordance with an embodiment, a stepped portion, preferably in the form of a bead 48 is integral with and extends from the distal end of the body 20 so as to be spaced from the flange 46. The bead 48 has a curved or rounded surface 49. A secondary seal member 50, such as an elastomer O-ring, surrounds the lower porting of the housing 44 and provides a seal in contact with an outer surface 52 of the housing 44, the surface 49 of the bead 48, and an inner surface 54 of a carrier 56. The carrier 56 surrounds the lower or distal end of the housing and is connected to the lower portion of the shield 18.

The secondary seal member 50, with a portion being compressed against the bead 48, substantially reduces or eliminates the ability for liquid, shown generally at 58, that may enter openings 59 in the shield 18 to migrate into the space, shown generally at 60, between the outer surface 52 of the housing 44 and the inner surface 62 of the body 20.

Figure 4:
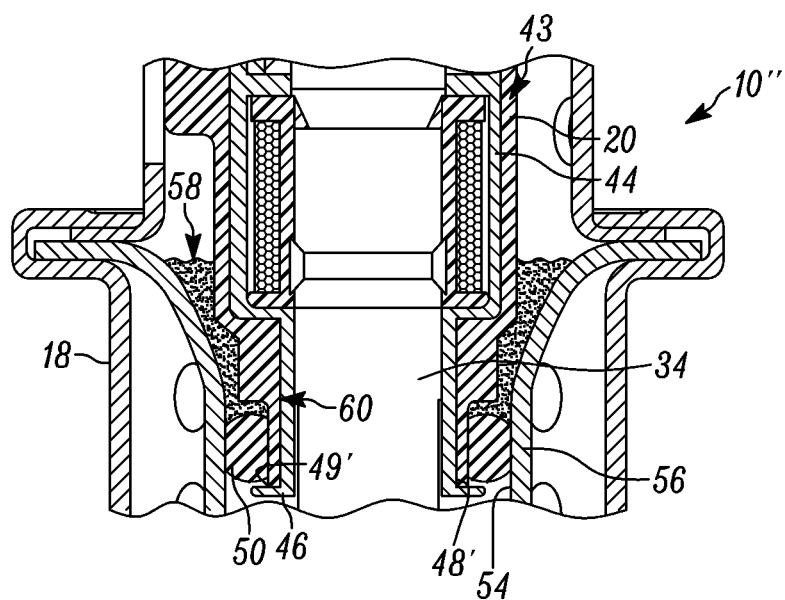
FIG. 4 is a sectional view of a portion of a fluid injector having an improved corrosion isolation seal, according to an alternate embodiment of the present invention.

An alternate embodiment of the injector 10" is shown in FIG. 4, with like numbers referring to like elements. In this embodiment, the stepped portion is defined as an extension 48' integral with the body 20 that extends from the body 20 down to the flange 46. The secondary seal member 50 provides a radial seal sandwiched between the planar surface 49' of the extension 48' and an inner surface 54 of the carrier 56 to eliminate the ability for liquid 58 migrate into the space 60.

Thus, the stepped portions 48, 48' that abut with the metal housing 44 substantially eliminate the possibility of RDU injector corrosion and subsequent failure by isolating the vulnerable portion of fuel injector from the external environment. The embodiments allow for normal expansion and contraction of the O-ring 50 due to heat and swelling without overfilling the O-ring gland, which could cause O-ring failure.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fluid injector comprising:
    a valve assembly constructed and arranged to control flow of fluid from an inlet to an outlet of the injector,
    a metal housing surrounding at least a portion of the valve assembly,
    a plastic body molded over at least a portion of the metal housing, a distal end of the plastic body defining an integral stepped portion extending from the plastic body,
    a carrier surrounding at least the distal end of the plastic body, and
    a seal member in contact with at least the stepped portion of the plastic body and a surface of the carrier to prevent liquid from entering a space between the metal housing and the plastic body.

2. The injector of claim 1, wherein the valve assembly includes a coil, a pole piece, and an armature movable with respect to the pole piece.

3. The injector of claim 1, wherein the stepped portion is in the form of a bead having a curved surface, the seal member engaging in the curved surface.

4. The injector of claim 1, wherein the seal member contacts the stepped portion, a portion of the metal housing, and the surface of the carrier.

5. The injector of claim 1, wherein the stepped portion abuts with the metal housing.

6. The injector of claim 1, wherein the seal member is sandwiched between a planar surface of the stepped portion and the surface of the carrier to define a radial seal.

7. The injector of claim 6, wherein a distal end of the metal housing includes a flange for holding the seal member, the stepped portion extending to the flange.

8. The injector of claim 1, wherein a distal end of the metal housing includes a flange for holding the seal member, the flange being spaced from the stepped portion with the seal member disposed between the flange and the stepped portion.

9. The injector of claim 8, wherein the seal member is an elastomer O-ring.

10. The injector of claim 1, wherein the seal member is an elastomer O-ring.

11. The injector of claim 1, wherein the injector is a reductant delivery unit injector and includes a shield surrounding a portion of the body and the carrier, the shield including openings defined thereon.

12. The injector of claim 1, further comprising a shield surrounding a portion of the body and the carrier, the shield including openings defined thereon.

13. A fluid injector comprising:
    a valve assembly constructed and arranged to control flow of fluid from an inlet to an outlet of the fluid injector,
    a metal housing surrounding at least a portion of the valve assembly,
    a plastic body molded over at least a portion of the metal housing, a distal end of the plastic body defining an integral stepped portion extending from the plastic body,
    a carrier surrounding at least the distal end of the plastic body, and
    a seal member disposed between and contacting the stepped portion of the plastic body and the carrier, the seal member preventing liquid from entering a space between the metal housing and the plastic body.

14. The injector of claim 13, wherein the stepped portion of the plastic body is in the form of a bead having a curved surface, the seal member engaging the curved surface.

15. The injector of claim 13, wherein the seal member contacts the stepped portion of the plastic body, the metal housing, and the carrier.

16. The injector of claim 13, wherein the stepped portion of the plastic body abuts with the metal housing.

17. The injector of claim 13, wherein a distal end of the metal housing includes a flange for holding the seal member, the flange being spaced from the stepped portion of the plastic body with the seal member disposed between the flange and the stepped portion of the plastic body.

18. The injector of claim 13, wherein a distal end of the metal housing includes a flange for holding the seal member, the stepped portion of the plastic body extending to the flange.

19. The injector of claim 13, wherein the seal member is an elastomer O-ring.

20. The injector of claim 13, wherein the seal member is disposed between and contacts the metal housing and the carrier and is disposed between and contacts the stepped portion of the plastic body and the carrier.

21. The injector of claim 13, wherein the stepped portion of the plastic body contacts and is disposed between and contacts the metal housing and the seal member, and the seal member is disposed between and contacts the stepped portion of the plastic body and the carrier.

22. The injector of claim 13, wherein the injector is a reductant delivery unit injector and includes a shield surrounding a portion of the body and the carrier, the shield including openings defined thereon.

23. The injector of claim 13, further comprising a shield surrounding a portion of the body and the carrier, the shield including openings defined thereon.

* * * * *